(No Model.)

O. AMES.
PIPE COUPLING.

No. 530,917.  Patented Dec. 18, 1894.

Witnesses.
E. L. Harlow
L. H. Grow

Inventor.
Oakes Ames
By E. L. Tilman
J. S. Knight
Attys.

THE NORRIS PETERS CO., PHOTO-LITHO., WASHINGTON, D. C.

UNITED STATES PATENT OFFICE.

OAKES AMES, OF CANTON, MASSACHUSETTS, ASSIGNOR TO THE METEOR DESPATCH COMPANY, OF PORTLAND, MAINE, AND BOSTON, MASSACHUSETTS.

PIPE-COUPLING.

SPECIFICATION forming part of Letters Patent No. 530,917, dated December 18, 1894.

Application filed January 18, 1894. Serial No. 497,257. (No model.)

*To all whom it may concern:*

Be it known that I, OAKES AMES, of Canton, county of Norfolk, and Commonwealth of Massachusetts, have invented certain new and useful Improvements in Pipe-Couplings; and I do hereby declare that the following is a full, clear, and exact description of the invention, which will enable others skilled in the art to which it appertains to make and use the same.

The object of my improvement is to produce a tight fitting clamp to connect sections of pipe, and it is especially adapted for connecting sections of pipe in pneumatic despatch tube systems.

Figure 1:
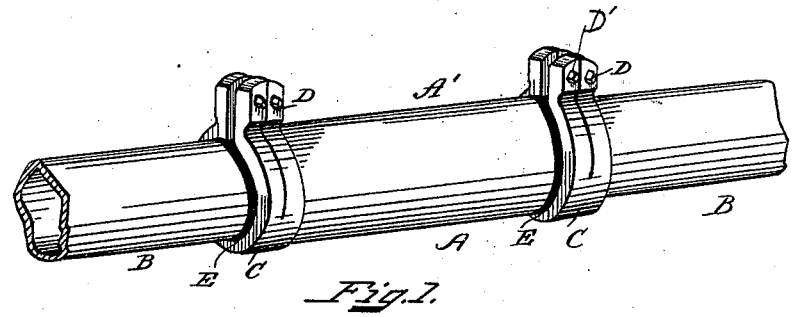
Figure 2:
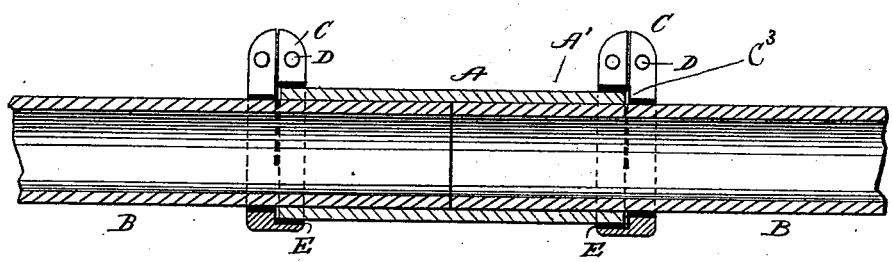
Figure 3:
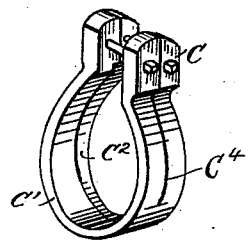
Figure 4:
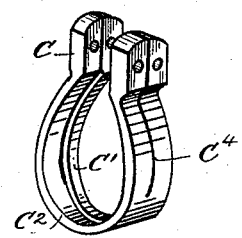

In the accompanying drawings:—Figure 1 represents a perspective view of two sections of pipe joined together by my improved clamp. Fig. 2 represents a longitudinal, central section of the same. Figs. 3 and 4 are detail, perspective views showing the rings by which the clamp and sections of pipe are fitted together.

A represents the clamp, which consists of the sleeve A' and the rings C C. As shown in the drawings, the junction of the two sections of the pipe B is covered by the sleeve A' of the clamp A, and at each end of the sleeve and around the said sleeve and tubes the rings C C are located. The right and left hand rings are each constructed of two internal diameters, one $C^2$ sufficiently large to fit around the exterior of the sleeve A' and the other C' to fit around the exterior of the tube B, so that each ring on its interior fits around the tube B and also around the sleeve A', as shown at $C^3$.

The rings C C are cut down as at $C^4$ through the top and sides along the line where the ends of the sleeve abut and contact with the flange of the smaller diameter C', so that the portion of the ring around the sleeve A' and that around the tube B may, to an appreciable degree, be screwed up independently one of the other and thus avoid the extreme precision which would be required where the rings were made of one piece to fit around the sleeve and tube. The said rings are tightened around the sleeve and tubes my means of the screws D D', and hold the sections of the pipe firmly together and prevent them from separating or breaking apart on account of the pressure in said tubes.

E represents suitable packing between the rings C C and the sleeve and tubes.

I do not limit myself to the exact arrangement and construction shown as the same may be varied without departing from the spirit of my invention.

Having thus ascertained the nature and set forth the construction of my invention, what I claim as new, and desire to secure by Letters Patent of the United States, is—

A clamp or coupling for pipe sections having a sleeve covering the junction of said pipe sections, a ring of two internal diameters adapted to fit around the pipe and end of the sleeve and split downwardly on a line between the two diameters, and means for securing both parts of said ring independently of one another to said sleeve and pipe.

In testimony whereof I have signed my name to this specification, in the presence of two subscribing witnesses, on this 12th day of January, 1894.

OAKES AMES.

Witnesses:
E. L. HARLOW,
L. H. TROW.